(12) United States Patent
Parisi et al.

(10) Patent No.: US 6,616,060 B2
(45) Date of Patent: Sep. 9, 2003

(54) FLEXIBLE FILM CARTRIDGE WITH BALANCED EFFORT

(75) Inventors: Mark Joseph Parisi, East Amherst, NY (US); Gerald M. Goupil, Jr., N. Tonawanda, NY (US); Stephan Michael Vetter, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/122,980

(22) Filed: Apr. 15, 2002

(65) Prior Publication Data

US 2003/0071131 A1 Apr. 17, 2003

Related U.S. Application Data

(60) Provisional application No. 60/328,593, filed on Oct. 11, 2001.

(51) Int. Cl.[7] .................................................. B60H 1/02
(52) U.S. Cl. .................................. 237/12.3 B; 454/121
(58) Field of Search ................................. 454/121, 156, 454/143; 237/12.3 B, 12.3 R

(56) References Cited

U.S. PATENT DOCUMENTS

| | | | |
|---|---|---|---|
| 5,105,730 A | 4/1992 | Smith | 454/251 |
| 5,160,115 A | 11/1992 | Ito et al. | 251/183 |
| 5,326,315 A | 7/1994 | Inoue et al. | 454/126 |
| 5,901,943 A | 5/1999 | Tsunoda | 251/454 |

*Primary Examiner*—Derek Boles
(74) *Attorney, Agent, or Firm*—Patrick M. Griffin

(57) ABSTRACT

An HVAC system including a housing, an evaporator assembly, a heater core assembly, an air inlet assembly, a fan assembly, and a film valve assembly including first and second rollers, wherein each roller includes a biasing member with a constant force urging the biasing members to rotate and the biasing members are biased in opposite directions.

38 Claims, 3 Drawing Sheets

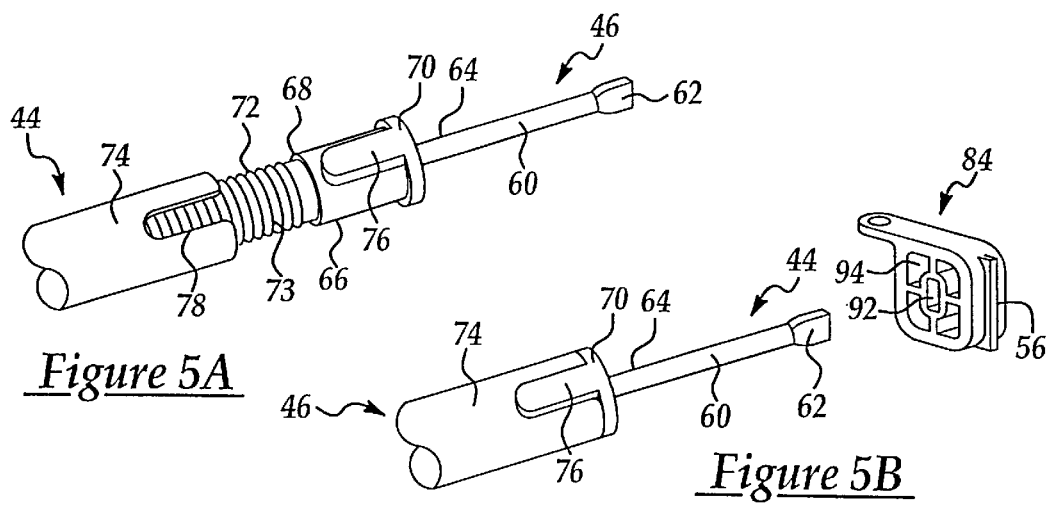
Figure 5A
Figure 5B
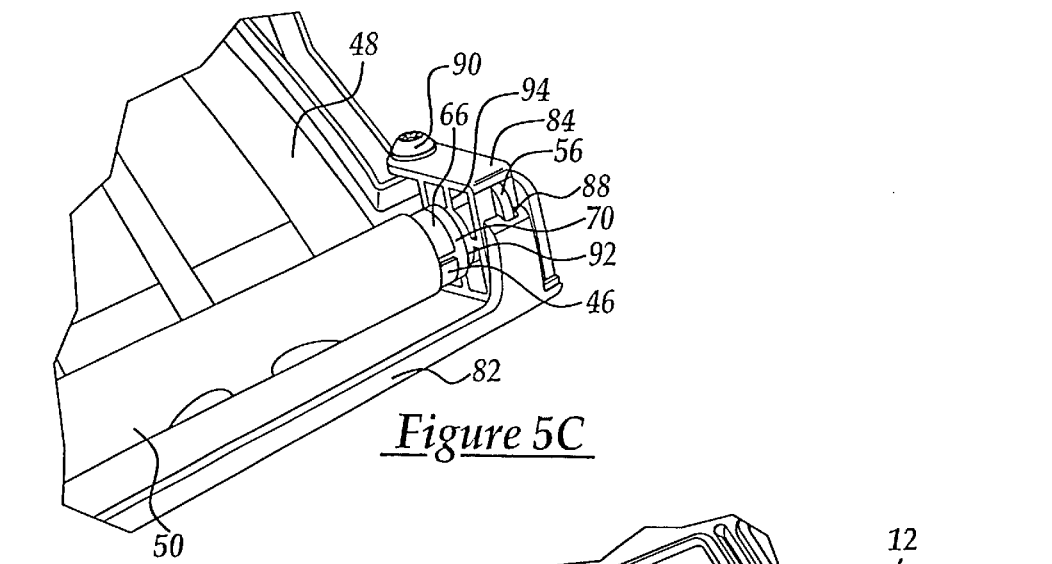
Figure 5C
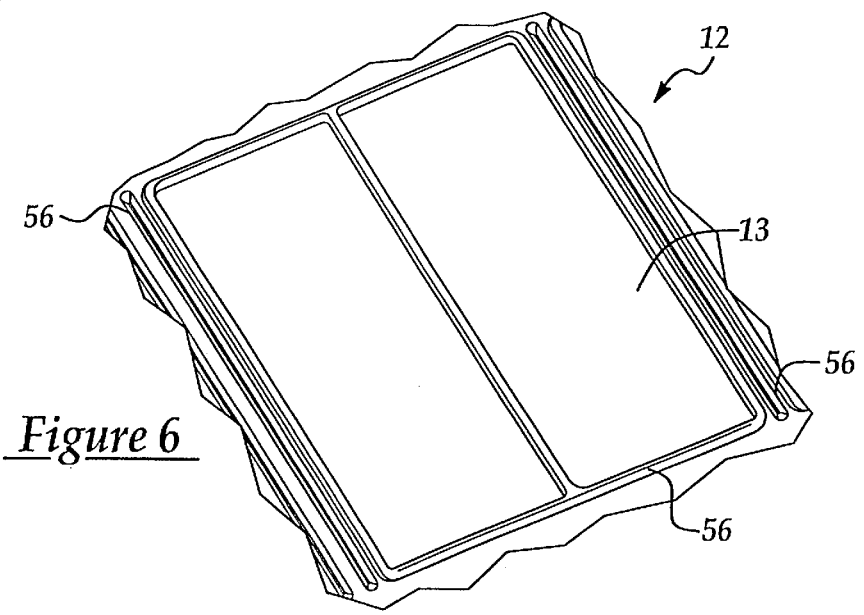
Figure 6

US 6,616,060 B2

FLEXIBLE FILM CARTRIDGE WITH BALANCED EFFORT

CROSS-REFERENCE TO RELATED APPLICATIONS

This application claims the benefit of U.S. Provisional Patent Application Serial No. 60/328,593, filed Oct. 11, 2001.

FIELD OF THE INVENTION

The present invention generally relates to a film valve assembly and, more particularly, to a film valve assembly for a heating, ventilation and air conditioning system for a vehicle.

BACKGROUND OF THE INVENTION

Conventional heating, ventilation and air conditioning (HVAC) systems for vehicles generally include a housing, an evaporator, a heater core having a housing, an evaporator assembly coupled to the housing, an evaporator, a heater core, an air inlet, a fan and various doors or mode valves for controlling the volume and direction of air flow and generating outlet air of a desired volume and temperature. Together these components receive, temper and direct the flow of forced air through several outlets or vents in the vehicle. The outlets through which the forced air ultimately exits are determined by the various doors which rotate or swing back and forth to open or close off openings and passages and cause air flow to be forced in one direction or another or a combination of both. Air may be directed to various areas of the car depending on the state of the mode valves. For example, air may be forced through outlets directed at the windshield in a defrost or defog mode, or through outlets directed at mid-height level in an air-conditioning mode, or to lower outlets directed to the floor in a heat mode, or various combinations thereof. Although, air of any temperature may be directed to and through any of them.

More recently, designs utilizing a flexible film valve rather than doors have been proposed for controlling volume and direction of air flow. Generally, the flexible film valve is disposed in a frame having rollers. The flexible film valve includes various apertures formed therein, is rolled back and forth over a first roller to cover or uncover various openings and may include an actuator for controlling the roller to wind and unwind the film valve.

Typical film valve designs are disclosed in U.S. Pat. No. 5,160,115 to Ito, et al. and U.S. Pat. No. 6,273,811 B1 to Pawlak, III. The '115 patent discloses an HVAC assembly including a film valve assembly having one roller with a biasing member and a motor. The '811 patent discloses an HVAC assembly including a film valve assembly having two rollers, each with a biasing member and a motor, and each operating a separate film valve. Such designs cause excessive wear on the film valve, the roller and the actuator, thereby increasing costs, and introduce noise in the system due to increased operational efforts required which may be displeasing to the driver of the vehicle.

In addition, the frame in which the film valve is situated typically comprises a static design specifically manufactured to be fitted onto an HVAC housing. Therefore, a frame must be designed and manufactured to meet each HVAC housing design, thereby increasing engineering and tooling cost.

The present invention is aimed at solving one or more of the problems described above.

SUMMARY OF THE INVENTION AND ADVANTAGES

In one aspect of the present invention, a film valve assembly is provided for a heating, ventilation and air conditioning (HVAC) system for a vehicle having a housing including apertures and ribs, an evaporator assembly, and a heater assembly. The film valve assembly includes a frame disposed on the housing for defining an air mixing chamber therebetween, a first roller disposed on the frame, a first biasing device continually urging the first roller to rotate in a first direction under a first constantly applied force, a second roller disposed on the frame, a second biasing device continually urging the second roller to rotate in a second direction under a second constantly applied force, and a film valve extending between the rollers with a first end disposed on the first roller and a second end disposed on the second roller.

In another aspect of the invention, the film valve assembly further includes a cap disposed on the frame and having one of the first and second rollers disposed thereon.

In yet another aspect of the invention, the film valve assembly includes a frame having a first segment and a second segment and a first hinge assembly for rotatably coupling the first and second segments. The film valve assembly may further include a frame having a third segment and a second hinge assembly for rotatably coupling the third segment to one of the first and second segments.

In another aspect of the invention, the first and second rollers each include an axle having a first distal end and a second distal end, a cylinder having a hollow end and a beveled end with the axle being disposed on the hollow end and extending therefrom, a shaft disposed on the beveled end. The rollers are disposed on the beveled end with the shaft disposed thereon. Each roller further includes a biasing device continually urging its respective roller to rotate in a direction under a constantly applied force. An actuator providing non-constant force is coupled to one of the first and second rollers for providing rotational torque to the roller.

The several embodiments of the present invention provide advantages including a more efficient, less expensive, quieter film valve assembly. The film valve assembly may be adapted to be used with several HVAC assembly configurations, thereby decreasing engineering and tooling costs.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5A is a partially exploded perspective view of the take-up roll, according to an embodiment of the present invention;

FIG. 5B is a perspective view of the take-up roll assembly, according to an embodiment of the present invention;

FIG. 5C is a segmented perspective view of the take-up roll installed in the film valve assembly, according to an embodiment of the present invention; and FIG. 6 is a fragmented view of a portion of the flexible film valve cartridge across which the flexible film translates during operation.

DETAILED DESCRIPTION OF THE PREFERRED EMBODIMENT

Referring to the Figures, wherein like numerals indicate like or corresponding parts throughout the several views, a heating, ventilation and air conditioning (HVAC) system for a vehicle according to one embodiment is generally shown at 10.

Figure 1:
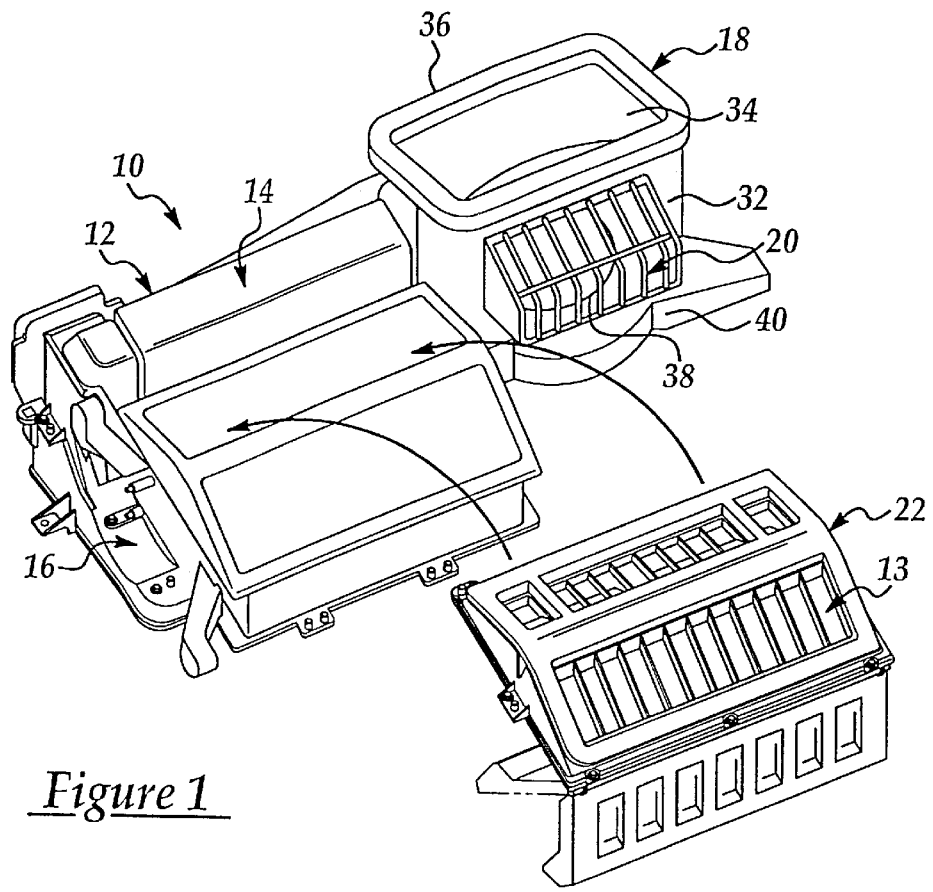
FIG. 1 is a perspective view of a heating, ventilation and air conditioning (HVAC) system having a film valve assembly disposed thereon, according to an embodiment of the present invention.
Figure 2:
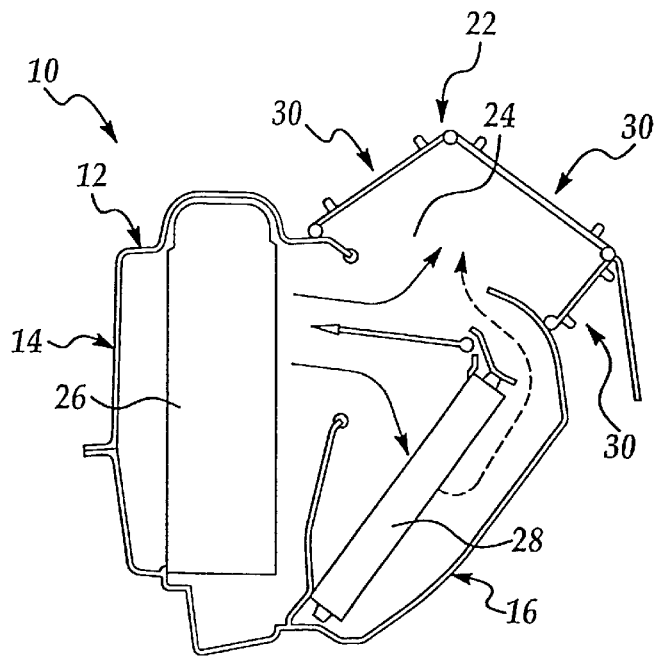
FIG. 2 is cross-sectional view of the HVAC system of FIG. 1, according to an embodiment of the present invention.

Referring to FIGS. 1 and 2 the HVAC system 10 generally includes a housing 12 defining at least one housing aperture 13 therein for directing air to the desired location of a passenger compartment of the vehicle, an evaporator assembly 14 coupled to the housing 12, a heater core assembly 16 coupled to the evaporator assembly 14 and the housing 12, an air inlet assembly 18 coupled to the evaporator assembly 14, a fan assembly 20 disposed on the air inlet assembly 18, and a film valve assembly 22 disposed on the housing 12 for defining an air mixing chamber 24 therebetween.

With continuing reference to FIGS. 1 and 2, the evaporator assembly 14 generally includes an evaporator core 26 enclosed in the housing 12. The heater core assembly 16 generally includes a heater core 28 enclosed in the housing 12. Typically, the evaporator core 26 is located upstream of the heater core 28. Air, either pulled-in outside air or recirculated inside air, enters the air inlet assembly 18 having a passageway 32 defining an aperture 34 at an end 36 thereof. The air is pulled into and forced through the HVAC system 10 by the fan assembly 20 having a fan 38 disposed in a fan housing 40 coupled to the air inlet assembly 18.

Typically, air temperature is controlled and determined by the evaporator core 26, which can be turned on and off along with the rest of the HVAC system 10, and the heater core 28, which is generally always activated and hot. The evaporator core 26 generally extends across the entire width of the case housing 12 such that all the forced air passes through it first, regardless of whether the evaporator core 26 is activated and cold or switched off. The heater core 28 traditionally has a constant flow of engine coolant flowing through it whenever the engine is running. Moreover, the degree of heating of air flow is varied not by varying the temperature of the heater core 28, but by varying the proportion of air flow over and through it.

Air flow routed through the heater core 28 is directed up the back face of the heater core 28 and into the air mixing chamber 24. Within the air mixing chamber 24, any air that has passed straight through the evaporator core 26 is mixed with any air that has been routed through the heater core 28 to achieve a desired temperature. The tempered air is then forced from the mixing chamber 24 through one or more outlets 30 to an area as selected by an operator, such areas including the windshield in a defrost or defog mode, the mid-height level in an air-conditioning mode, the floor in a heat mode, or any combination thereof.

Referring to FIGS. 3A through 5C, the film valve assembly 22, according to an embodiment of the present invention, includes a frame 42, a first roller 44 disposed on the frame 42 having a first biasing device 72 continually urging said first roller 44 to rotate in a first direction under a first constantly applied force, a second roller 46 disposed on the frame 42 having a second biasing device 73 continually urging said second roller 46 to rotate in a second direction under a second constantly applied force, and a film valve 48 having a first end 50 disposed on the first roller 44 and a second end 52 disposed on the second roller 46 with the film valve 48 extending therebetween for controlling air flow. The film valve 48 defines at least one aperture 54 therein for air flow therethrough. In addition, the frame 42 further may include one or more idle rollers 58 rotatably supported on the frame 42 which supports the film valve 48 and stabilizes the tension of the film valve 48 thereon, as described below.

Referring to FIGS. 5A and 5B, the first roller 44 includes an axle 60. The axle 60 may be a metal rod, a plastic rod or any other suitable type of rod. A first distal end 62 of the axle 60 is flat so as to interface with the frame 42 and ensure that the axle 60 does not rotate, as described below.

With continued reference to FIGS. 5A and 5B, the first roller 44 further includes a cylinder 66 having a hollow end 68 and a beveled end 70. The cylinder 66 further includes a locking rib 76 and may be metal, plastic or any other suitable material. The second end 64 of the axle 60 is disposed on the hollow end 68 and extends therefrom. The first biasing device 72 has one end disposed on the beveled end 70 and has an opposite end affixed to axle 60 for continually urging the first roller 44 to rotate in a first direction under a first constantly applied force. The first biasing device 72 may be a torsion spring, a helical torsion spring or any other suitable member which provides torsional force.

With continued reference to FIG. 5B, a shaft 74 defining a groove 78 is disposed annularly about the first biasing device 72 and the cylinder 66 such that the locking rib 76 slides into the groove 78. The shaft 74 may be metal, plastic or any other suitable material. Operationally, rotational force applied to the first biasing device 72 is transferred to the shaft 74 to provide rotation thereto.

According to an embodiment of the present invention, the second roller 46 includes the axle 60, cylinder 66, shaft 74, and the second biasing device 73 continually urging the second roller 46 to rotate in a second direction under a second constantly applied force in a configuration identical to that of the first roller 44. According to one embodiment of the present invention, the first direction is opposite to the second direction. In accordance with yet another embodiment, the first direction is in the same direction as the second direction. The second biasing device 73 may be a torsion spring, a helical torsion spring or any other suitable member which provides torsional force.

Figure 3A:
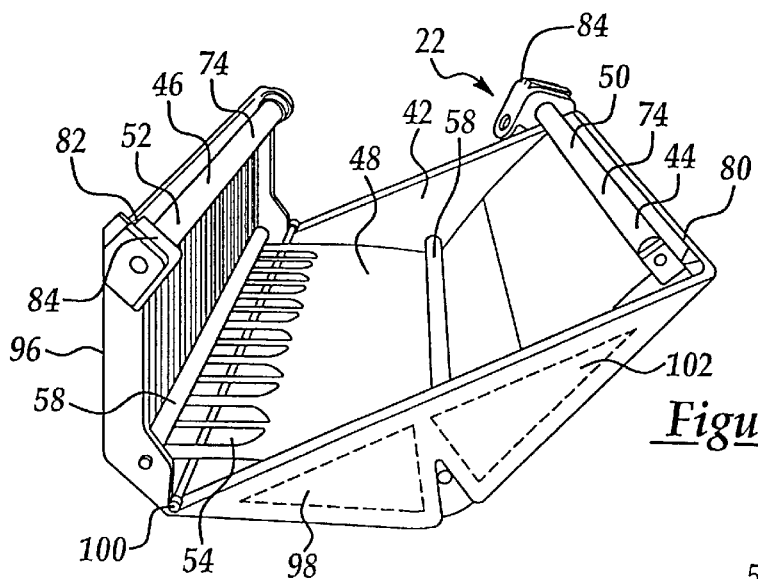
FIG. 3A is a side perspective view of the film valve assembly of FIG. 1, according to an embodiment of the present invention.
Figure 3B:
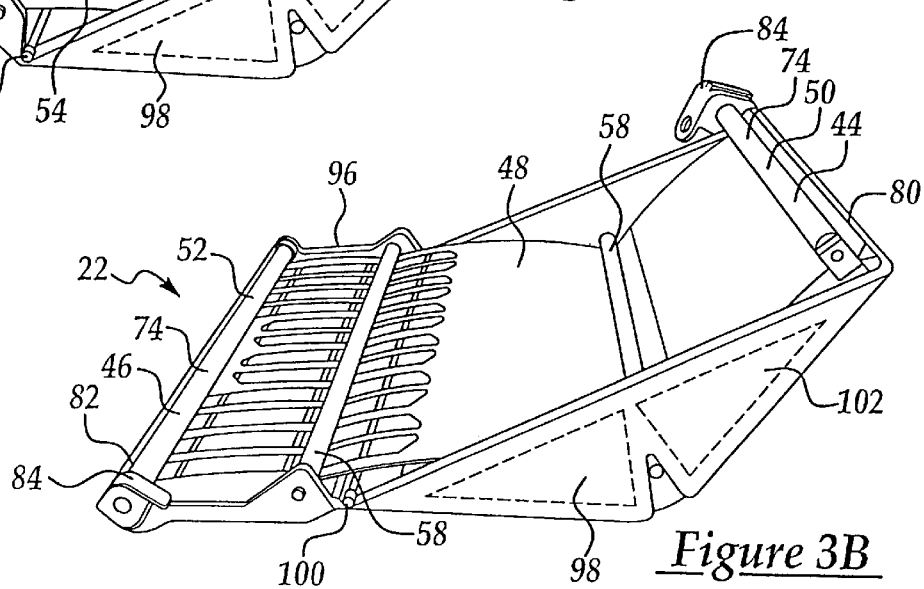
FIG. 3B is a side perspective view of the film valve assembly of FIG. 1 illustrating the rotational aspect of a segment thereof, according to an embodiment of the present invention.

With reference to FIGS. 3A and 3B, the rollers 44, 46 are disposed on opposite ends 80, 82 of the frame 42 with the first and second ends 50, 52 of the film valve 48 coupled thereto. With reference to FIG. 5C, a cap 84 is disposed on the frame 42 and an end of the second rollers 46 is disposed thereon with the other end of the roller 46 disposed on the frame. The frame 42 includes a slot 88 which receives the cap 84. The cap 84 includes an alignment rib 56 which snaps into the slot 88. The frame 42 may include additional slots and the cap 84 may include additional alignment ribs matching the number of slots. Moreover, the cap 84 may include a fastener 90 for further securing the cap 84 to the frame 42. The fastener 90 may be a screw, a bolt or any other suitable fastener.

With continued reference to FIG. 5B, the cap 84 further includes a key slot 92 and reinforcement ribs 94. The first distal end 62 of the axle 60 fits into the key slot 92 and prevents the rod from rotating upon application of torque to the rollers 44, 46.

Referring to FIGS. 1 through 3B, according to another embodiment of the present invention, the frame 42 includes a first segment 96 and a second segment 98 connected to the first segment 96 for movement relative thereto. The first and second segments 96, 98 may be connected by a first hinge assembly 100 having a stationary member (not shown) and a rotating member (not shown) which rotatably couples the first and second segments 96, 98. The first hinge assembly 100 enables the first and second segments 96, 98 to be repositionable, thereby allowing the frame to change angular shape to be fitted to multiple HVAC assembly configurations and to aid in assembly. The first hinge assembly 100 may be a living hinge or any other suitable hinge. The first and second segments 96, 98 may be connected so as be moveable relative to each other by any other suitable means.

Referring to FIGS. 3A and 3B, the frame 42 may include a third segment 102 rotatably coupled to one of the first and second segments 96, 98 by a second hinge assembly similar to hinge 100 and positioned proximate to idler roller 58. Such a three-segmented configuration permits each segment 96, 98, 102 to be repositionable with respect to each other for improved access or for greater interchangeability between different configurations of HVAC systems. The second hinge assembly may be a living hinge or any other suitable hinge.

The frame 42 being repositionable permits features of the housing 12 to be molded that otherwise would be die locked. Thus, the frame 42 may be adapted to many different geometries and many different vehicles, thereby reducing engineering and tooling costs. Moreover, the repositionable frame 42 in an open position allows easier assembly of the frame 42. As shown in FIG. 3A, the film valve assembly 22 of the present invention is shown in a closed position. As shown in FIG. 3B, the film valve assembly 22 is shown in an open position.

Figure 4:
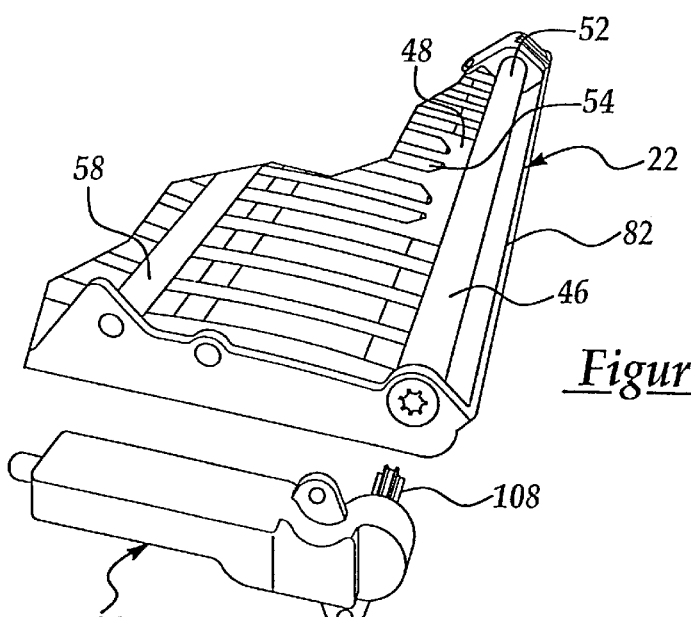
FIG. 4 is a partially exploded side perspective view of a power source disposed on the film valve assembly of FIG. 3, according to an embodiment of the present invention.

Referring to FIG. 4, an actuator 106 is coupled to HVAC module 10 and to roller 46 thereby providing a non-constant rotational torque coupled to the second roller 46. The actuator 106 may be a stepper motor, a direct current (DC) motor and gears, or any suitable actuator. The actuator 106 includes a rotatable connector 108 which interfaces the actuator 106 to the second roller 46 in female/male engagement and transfers a positive rotational torque from the actuator 106 to the second roller 46. The rotatable connector 108 may have a torx head, a phillips head or any other suitable connector. According to yet another embodiment, an actuator 106 may be coupled to each of the first and second rollers 44, 46.

With reference to FIGS. 1 through 4, the operation of the HVAC assembly 10 according to an embodiment of the present invention will now be described. The HVAC assembly 10 of the present invention utilizes a balanced dual biasing member concept. The first and second biasing devices 72, 73, providing a constant force urging the first and second rollers 44, 46 to rotate, are disposed at the ends of the frame 42. The first biasing device 72 operating at the first roller 44 is pre-tightened and provides the required torque to wind up the film valve 48. The torque of the first biasing device 72 is designed to operate in extreme conditions of temperature and air flow in the module (typically −40 degrees Fahrenheit and high fan speed).

The first biasing device 72 must overcome the frictional forces of the film valve 48 contacting the cartridge 42 and traveling along the frame 42 and also overcome the forces introduced by the bending of the film valve 48 around the rollers 44, 46. The second biasing device 73 on the second roller 46 serves as an assist to the actuator 106 which operates the rotation of the second roller 46. As the film valve 48 winds on the second roller 46, thereby tightening the first roller 44, the actuator 106 must overcome the tension force of the first roller 44 and the frictional forces. With the addition of the second biasing device 73, torque loads on the actuator 106 may be minimized and better balanced.

Upon activation of the actuator 106, the rotatable connector 108 rotates the second roller 46 in the first direction. Upon rotation by the actuator 106 of the second roller 46 and with the assistance of the tension of the second biasing device 73, when a torque great enough to overcome the tension force of the first biasing device 72 is generated, the film valve 48 is wound onto the second roller 46 and off the first roller 44. While winding, the second biasing device 73 in the second roller 46 assists the rotation and reduces the torque required by the actuator 106 to continue winding the film valve 48. Without the assistance of the second biasing device 73, the actuator 106 would be required to be larger and more powerful in order to overcome the resistance of the first biasing device 72 so that the film valve may rotate and align the apertures 54 with the outlets 30 as required to accommodate the direction of air flow as selected by the user.

The net result is that the torque is positive on each roller 44, 46, thereby making the entire assembly 10 more balanced. In addition, torque loads on the actuator 106 are reduced compared to maximum torque in a single spring system.

Referring to FIG. 6, the frame 42 further includes ribs 56 disposed thereon over which the film valve 48 travels, as described below. The ribs 56 reinforce the frame 42 around the housing apertures 13 and prevent the film valve 48 from getting trapped on or pushed through the housing apertures 13. Moreover, the ribs 56 minimize friction created when the film valve 48 travels across the case housing 12 upon rotation, thereby reducing drag and the torque required to rotate the film valve 48.

The foregoing detailed description shows the preferred embodiments of the present invention are well suited to fulfill the objectives of the invention. It is recognized that those skilled in the art may make various modifications or additions to the preferred embodiments chosen herein to illustrate the present invention, without departing from the spirit of the present invention. Accordingly, it is to be understood that the subject matter sought to be afforded protection should be deemed to extend to the subject matter defined in the appended claims, including all equivalents thereof.

The invention has been described in an illustrative manner, and it is to be understood that the terminology that has been used is intended to be in the nature of words of description rather than limitation. It will be apparent to those skilled in the art that many modifications and variations of the present invention are possible in light of the above teachings. Therefore, it is to be understood that the invention may be practiced otherwise than as specifically described within the scope of the amended claims.

What is claimed is:

1. A film valve assembly for a heating, ventilation and air conditioning (HVAC) system comprising:
   a frame;
   a first roller disposed on said frame;
   a first biasing device continually urging said first roller to rotate in a first direction under a first constantly applied force;
   a second roller disposed on said frame;
   a second biasing device continually urging said second roller to rotate in a second direction under a second constantly applied force; and
   a film valve extending between said rollers for controlling air flow with a first end disposed on said first roller and a second end disposed on said second roller.

2. An assembly as set forth in claim 1 including a cap disposed on said frame and having one of said first and second rollers disposed thereon.

3. An assembly as set forth in claim 2 wherein said frame includes a first segment and a second segment connected to said first segment for movement relative thereto.

4. An assembly as set forth in claim 3 wherein said segments are connected by a first hinge assembly for rotatably coupling said first and second segments.

5. An assembly as set forth in claim 4 wherein said frame includes a third segment.

6. An assembly as set forth in claim 5 including a second hinge assembly for rotatably coupling said third segment to one of said first and second segments.

7. An assembly as set forth in claim 6 wherein said first roller includes an axle having a first distal end and a second distal end.

8. An assembly as set forth in claim 7 wherein said first roller includes a cylinder having a hollow end and a beveled end with said axle being disposed on said hollow end and extending therefrom.

9. An assembly as set forth in claim 8 wherein said first roller includes a shaft disposed on said beveled end.

10. An assembly as set forth in claim 6 wherein said second roller includes an axle having a first distal end and a second distal end.

11. An assembly as set forth in claim 10 wherein said second roller includes a cylinder having a hollow end and a beveled end and said axle being disposed on said hollow end and extending therefrom.

12. An assembly as set forth in claim 11 wherein said second roller includes a shaft disposed on said beveled end.

13. An assembly as set forth in claim 9 including an actuator coupled to one of said first and second rollers for providing non-constant rotational torque to said one of said rollers.

14. An assembly as set forth in claim 13 wherein the actuator is electrically powered.

15. An assembly as set forth in claim 11 including an actuator coupled to each of said first and second rollers for providing non-constant rotational torque to each of said rollers.

16. An assembly as set forth in claim 1 wherein said film valve defines an aperture therein for air flow therethrough.

17. An assembly as set forth in claim 1 including an idle roller rotatably disposed on said frame for supporting said film valve.

18. An assembly as set forth in claim 1 wherein said first biasing device is a torsion spring.

19. An assembly as set forth in claim 1 wherein said second biasing device is a torsion spring.

20. An assembly as set forth in claim 1 including a housing having an evaporator assembly and a heater assembly disposed therein and having said frame disposed thereon for defining an air mixing chamber therebetween.

21. An assembly as set forth in claim 20, wherein said housing includes a plurality of ribs disposed thereon.

22. In a heating, ventilation and air conditioning (HVAC) assembly for a vehicle comprising:
   a housing;
   an evaporator assembly coupled to said housing;
   a heater core assembly coupled to said evaporator assembly and said housing;
   an air inlet assembly coupled to said evaporator assembly;
   a fan assembly disposed on said air inlet assembly; and
   a film valve assembly disposed on said housing for defining an air mixing chamber therebetween and having a frame, a first roller disposed on said frame, a first biasing device continually urging said first roller to rotate in a first direction under a first constantly applied force, a second roller disposed on said frame, a cap disposed on said frame and having one of said first and second rollers disposed thereon, and a film valve defining an aperture and extending between said rollers with a first end disposed on said first roller and a second end disposed on said second roller, the improvement comprising a second biasing device continually urging said second roller to rotate in a second direction under a second constantly applied force.

23. An assembly as set forth in claim 22 wherein said frame includes a first segment and a second segment.

24. An assembly as set forth in claim 23 including a first hinge assembly (100) for rotatably coupling said first and second segments.

25. An assembly as set forth in claim 24 wherein said frame includes a third segment.

26. An assembly as set forth in claim 25 including a second hinge assembly for rotatably coupling said third segment to one of said first and second segments.

27. An assembly as set forth in claim 26 wherein each of said first and second rollers includes an axle having a first distal end and a second distal end.

28. An assembly as set forth in claim 27 wherein each of said first and second rollers includes a cylinder having a hollow end and a beveled end and said axle being disposed on said hollow end and extending therefrom.

29. An assembly as set forth in claim 28 wherein each of said first and second rollers includes a shaft disposed on said beveled end.

30. An assembly as set forth in claim 29 including an actuator coupled to one of said first and second rollers for providing non-constant rotational torque to said one of said rollers.

31. An assembly as set forth in claim 29 including an actuator coupled to said each of said first and second rollers for providing non-constant rotational torque to each of said rollers.

32. An assembly as set forth in claim 30 including an idle roller disposed on said frame.

33. An assembly as set forth in claim 21 wherein each of said first and second biasing devices are torsion springs.

34. A method of directing air flow in a heating, ventilation and air conditioning (HVAC) assembly for a vehicle, wherein the HVAC assembly includes a housing, an evaporator assembly coupled to the housing, a heater core assembly coupled to the evaporator assembly and the housing, an air inlet assembly coupled to the evaporator assembly, a fan assembly disposed on said air inlet assembly, and a film valve assembly disposed on the HVAC assembly for defining an air mixing chamber therebetween and having a frame including first and second segments, first and second rollers disposed on the frame, first and second biasing devices, and a film valve having a first end disposed on the first roller and a second end disposed on the second roller, comprising the steps of:

continually urging the first roller to rotate in a first direction under a first constantly applied force;

continually urging the second roller to rotate in a second direction under a second constantly applied force; and extending the film valve between first and second rollers.

35. A method as set forth in claim 34 including the step of rotating the first and second segments relative to one another.

36. A method as set forth in claim 35 wherein the frame includes a third segment, including the step of rotating the third segment relative to at least one of the first and second segments.

37. A method as set forth in claim 36 including the step of providing non-constant rotational torque to the one of the rollers.

38. A method as set forth in claim 37 including the step of disposing an idle roller on the frame.

* * * * *